though lower pressures than the higher pressure may be used. When operating at the same pressure as the third distillation zone no additional pressure reduction of the solvent is required between the second part of the second distillation zone and the third distillation zone.

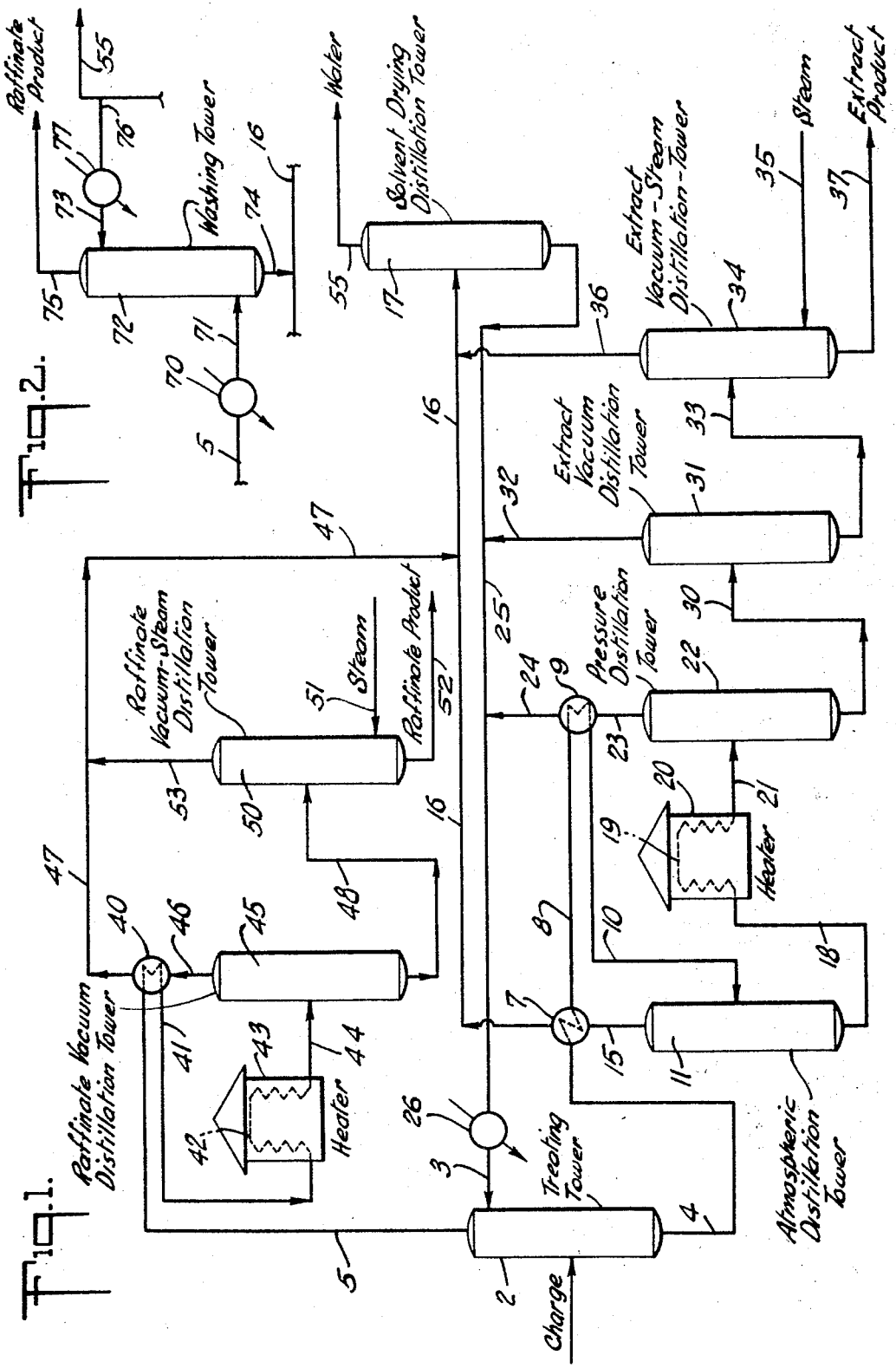

3,461,066
SOLVENT RECOVERY IN THE SOLVENT EXTRACTION OF HYDROCARBON OILS

Herbert C. Morris, Groves, and John I. Nixon, Bridge City, Tex; Roberta L. Nixon, administratrix of said John I. Nixon, deceased, assignors to Texaco Inc., New York, N.Y., a corporation of Delaware
Filed Dec. 23, 1966, Ser. No. 604,481
Int. Cl. C10g *21/28, 21/20*
U.S. Cl. 208—321                    9 Claims

ABSTRACT OF THE DISCLOSURE

This invention relates to an improved solvent recovery system in the solvent extraction of hydrocarbon oils with N-methyl-2-pyrrolidone. In accordance with this method, N-methyl-2-pyrrolidone is separated from a solvent extract-mix by a series of separate distillation steps arranged to efficiently utilize heat in the distillation and to separate solvent of controlled and low moisture content.

Background of the invention

*Field of the invention.*—In the manufacture of lubricating oils from raw petroleum stocks, it is necessary to remove unstable, naturally occurring materials which form deposits or become corrosive in operating equipment as the result of heating and oxidation or both. Additionally, in the case of paraffinic oils, it is often desirable to increase the viscosity index by removing the more aromatic constituents from the oil. To accomplish this, it is necessary to remove or destroy a significant amount of material present in the raw stock, typically ranging from 10 to 60 percent depending on the qualities desired in the product oil. The most common way to do this is by extraction with a solvent having selectivity for the more unstable molecules which are predominately aromatic and nonhydrocarbon materials. Prior to the advent of solvent extraction severe treatment with concentrated sulfuric acid was used to destroy these undesirable materials.

The above processing in which a substantial amount of material is removed from the charge stock is distinctly different from decolorizing treatments in lubricating oil manufacture where only a trace amount of coloring material is removed. Here, handling losses are usually greater than the amount of material removed. Common methods used for color improvement are for example, clay and mild acid treating. Such color improvement steps are often used after solvent refining. A raw stock that is only treated for color improvement is usually unsatisfactory as regards thermal and oxidative stability or viscosity index.

This invention is directed to the solvent extraction of hydrocarbon mixture using N-methyl-2-pyrrolidone as selective solvent referred to hereinafter for brevity at NMP. More particularly, it is directed to the solvent extractions of hydrocarbon mixtures boiling wholly above NMP that is above 396° F. and preferably having an ASTM initial boiling point of at lease 650° F. for example lubricating oil fractions, cracking stocks, fuels, and middle distillates. Such stocks are treated to effect separation of a raffinate product of increased stability and viscosity index, and reduced aromaticity from an extract product of increased aromaticity.

In petroleum refining practice, the various feed stocks and fractions treated are usually produced in contact with steam or water vapor and are stored in contact with liquid water so that they normally contain dissolved water and occasionally small amounts of entrained water. When solvent refining such "wet" stocks with a solvent such as NMP, the dissolved and entrained water is taken up by the solvent thereby reducing its solvent power and effectiveness for solvent refining. NMP is also hygroscopic so that it tends to take up water from the surrounding atmosphere in storage and handling. Furthermore the complete removal of solvent from treated oil fractions conveniently utilizes steam stripping to remove the final traces of solvent from the oil. When steam stripping is used, economy in solvent utilization requires recovery of the solvent appearing in the resulting condensate steams. Accordingly this invention is directed to an improved method of separating solvent in the solvent refining of hydrocarbon mixtures wherein extraneous water encountered in handling feed and process streams is efficiently eliminated from the system.

*Description of the prior art.*—In accordance with prior art practice in the solvent refining of hydrocarbon stocks, solvent is separated from the extract and raffinate fractions by conventional distillation and any water introduced into the separated solvent is separated in a separate distillation step or steps.

Summary of the invention

In accordance with this invention, a hydrocarbon mixture boiling above 396° F. to be separated into fractions of higher and lower aromaticity is contacted with a solvent comprising NMP forming a raffinate phase comprising raffinate product with a minor portion of said solvent dissolved therein and an extract phase comprising solvent with extract product and a small amount of water dissolved therein. Raffinate product is separated from the raffinate phase by distillation or by washing with another solvent such as water. Extract phase is passed to a first distillation zone wherein a first distillate is separated comprising water and a minor portion of said solvent in said extract phase from a first distillation bottoms product substantially free of water. The bottoms product from the first distillation zone is passed to a second distillation zone wherein a major portion of the solvent in said extract phase is separated as a distillate substantially free of water from a second distillation bottoms product. The second distillation zone bottoms product containing a minor portion of the solvent in said extract phase is substantially freed thereof by stripping in a third distillation zone with steam effecting separation of a distillate comprising solvent and water from a third distillation bottoms product comprising said extract product substantially free of solvent. Distillate from said first and third distillation zones are collected and passed to a fourth distillation zone effecting separation of water as distillate and solvent substantially free of water as fourth distillation bottoms product. Distillate from the second distillation zone and bottoms product from the fourth distillation zone, being solvent substantially free of water, are returned to the extraction zone to comprise at least a portion of the solvent therein.

Advantageously, the first distillation zone is maintained at a pressure within the range of about 0 to 25 pounds per square inch gauge. At least a part of the second distillation zone is maintained at a higher pressure within the range of about 25 to 100 pounds per square inch gauge and the third distillation zone is maintained at a lower pressure in the range of about 5 to 15 pounds per square inch absolute. When operating the second distillation zone at the aforesaid higher pressure, the distillate may advantageously be passed in indirect heat exchange with the extract phase passes to the first distillation zone to provide at least a part of the heat for the distillation therein.

In one embodiment of the process of this invention, the second distillation zone may comprise two parts the first of which is maintained at the aforesaid higher pressure and the second part is maintained at about the same pressure as the third distillation zone.

Solvent may be separated from the raffinate phase in a fifth distillation zone or it may be separated by water washing. When solvent is separated from raffinate phase in a fifth distillation zone, the distillate comprising solvent and water is passed to the fourth distillation zone with the feed thereto. When solvent is separated from the raffinate phase by water washing, the resulting water solution of solvent may be passed to the fourth distillation zone to recover the solvent therein or may be separated in a separate distillation zone. Advantageously, water separated as distillate in the fourth distillation zone may be employed for washing the raffinate phase. Solvent and hydrocarbon mixture are contacted in the extraction zone for example, at an extract phase outlet temperature of about 185° F. and with a dosage of about 120 volumes of solvent per 100 volumes of said hydrocarbon mixture.

Brief description of drawings

FIGURE 1 shows a flow diagram of a solvent refining system including distillation facilities for solvent recovery from both extract and raffinate phases.

FIGURE 2 shows a modification of the process of FIGURE 1 in which solvent is separated from the raffinate product by water washing.

Although the figures illustrate particular arrangements of apparatus in which the invention may be practiced, it is not intended to limit the invention to the particular apparatus or materials described.

Referring to FIGURE 1, charge oil containing a small amount of extraneous water is introduced at a temperature of about 100° F. through line 1 into treating tower 2. Treating tower 2 is a liquid contacting device suitable for solvent extraction. Treating tower 2 is preferably a rotating disc contactor, but may be any suitable liquid-liquid contacting device of about 1 to 10 theoretical stages for example a packed, spray or sieve tray column. If desired a pulsed or agitated column may be employed or a centrifugal contacting device such as a Podbielniak centrifugal contactor. N-methyl-2-pyrrolidone solvent at a solvent to oil dosage of about 120 volumn percent and at a temperature of about 252° F. is introduced into treating tower 2 through line 3. The oil charge and solvent are countercurrently contacted forming a raffinate phase comprising constituents of the charge insoluble in the solvent (predominantly paraffinic in type) together with a small amount of dissolved solvent and a minute amount of dissolved water. The constituents of the charge soluble in the solvent (predominantly aromatic in nature) and the bulk of the water dissolved in the charge are dissolved in the solvent forming an extract phase which is withdrawn from tower 2 through line 4 at a temperature of about 185° F. Extract phase in line 4 is passed through heat exchanger 7, line 8 and heat exchanger 9 whereby the extract phase is heated to about 420° F. which temperature is above the boiling point of the NMP solvent and the dissolved water.

The heated extract phase is then passed through line 10 at atmospheric distillation tower 11 which is desirably operated at a pressure within the range of from about atmospheric to about 25 pounds per square inch gauge and preferably at about 20 pounds per square inch gauge. In distillation tower 11, about 40% of the solvent and the water in the heated extract phase are vaporized and withdrawn as distillate through line 15. Distillate from tower 11 is then passed through line 15, exchanger 7 and line 16 to solvent drying distillation tower 17.

Extract phase free of water and containing about 60 percent of the solvent present in the extract phase withdrawn from treating tower 2 is withdrawn from the bottom of tower 11 through line 18 and is heated in coil 19 in heater 20 to a temperature of about 538° F. Heated extract phase is then passed through line 21 to pressure distillation tower 22 at a pressure of about 25 to 100 pounds per square inch gauge and preferably at about 55 pounds per square inch gauge. About 95 weight percent of the solvent in the charge to tower 22 is distilled overhead and separated as distillate in line 23. The distillate in line 23 at a temperature of about 505° F. is passed in indirect heat exchange with the feed to atmospheric distillation tower 11 in heat exchanger 9. After use for heat exchange, the distillate comprising dry solvent is passed through lines 24 and 25 to cooler 26 where the temperature is reduced to about 252° F. to supply solvent passed through line 3 to treating tower 2. Bottoms from tower 22 containing all of the extract oil and the remainder of the solvent is passed through line 30 to extract vacuum distillation tower 31 which is operated at a pressure within the range of about 5 pounds per square inch absolute up to atmospheric and preferably at about 11 pounds per square inch absolute. The vacuum in tower 31 effects vaporization of about 80 weight percent of the solvent present in the stream charged to tower 31 and the resulting distillate comprising an additional amount of dry solvent is discharged through line 32 to line 25 for recycle with the dry solvent therein. Remaining extract phase is withdrawn from the bottom of tower 31 through line 33 and passed to extract vacuum-steam distillation tower 34. Steam is introduced into the bottom of tower 34 through line 35 in an amount sufficient to vaporize the last trace of solvent present in the extract phase. The resulting solvent-steam distillate is withdrawn overhead through line 36 and is combined with the wet solvent stream in line 16. Extract product, substantially free of solvent is withdrawn from the bottom of tower 34 through line 37 and discharged to product storage not shown.

Raffinate phase in line 5 is passed through heat exchanger 40 and line 41 to heating coil 42 in heater 43 wherein it is heated to a temperature of about 475° F. Heated raffinate phase is discharged through line 44 to raffinate vacuum distillation tower 45 to effect substantially complete removal of the dissolved solvent from the raffinate phase. Distillation tower 45 is operated at a low pressure, for example, within the range of about 5 pounds per square inch absolute up to atmospheric and preferably about 11 pounds per square inch absolute. About 93% of the dissolved solvent and substantially all of the dissolved water is distilled overhead from tower 45 through line 46. Distillate in line 46 is passed through heat exchanger 40 and line 47 to line 16 where it is accumulated with other wet solvent streams passed to distillation tower 17. Distillation bottoms from tower 45 are withdrawn through line 48 and passed to raffinate vacuum-steam distillation tower 50. Distillation tower 50 is operated as a steam stripping tower with steam introduced through line 51 to remove remaining solvent from the raffinate product. Raffinate product is discharged through line 52 to storage, not shown. Overhead distillate from tower 50 comprising solvent and water vapor is discharged through line 53 and combined with the wet solvent stream in line 47.

Wet solvent accumulated as distillate from towers 11, 34, 45 and 50 is accumulated in line 16 and passed to solvent drying distillation tower 17. Distillation tower 17 is operated as a solvent dryer by distilling water as an overhead distillate through line 55 from dry solvent withdrawn from the bottom of tower 17 through line 25. Distillation tower 17 may be a conventional distillation column of about 6 to 10 theoretical stages.

In the flow shown, approximately 51.9 weight percent of the solvent charged to treating tower 2 is separated as dry solvent distillate from towers 11 and 22.

In the distillation system described above, the solvent is separated in a series of distillation steps to permit separation of a major portion of the solvent as dry solvent and at the same time to permit efficient utilization of the distillation heat. An initial distillation of the extract phase at a pressure within the range of about 0 to 25 pounds per square inch gauge is employed to separate minor portion of the solvent together with extraneous water introduced into the solvent extraction system with the feed and the solvent. Heat for this initial distillation is supplied by the sensible heat of the extract phase from the extraction tower, by indirect heat exchange with the distillation vapors from the initial distillation, and by indirect heat exchange with vapors from a subsequent distillation. The resulting partially stripped extract phase substantially free of water, is heated with heat supplied from a source outside the distillation zone and the heated stream is passed at a pressure of about 25 to 100 pounds per square inch gauge to a second distillation zone. The hot distillation vapors from the second distillation zone, at a higher pressure and temperature, are used to supply heat to the first zone as described hereinbefore. Upon condensation, this distillate comprises a dry solvent stream which is recycled to the solvent extraction treating tower. Bottoms from the second distillation zone are passed to a vacuum distillation tower maintained at about 5 pounds per square inch absolute up to atmospheric where additional solvent is vaporized by the sensible heat of the tower feed. Upon condensation, this solvent stream forms an additional dry solvent stream which is returned to the extraction tower. The distillation vapor from the vacuum distillation tower is produced in too small an amount and at too low a temperature to warrant its use in heating other process streams. The small amount of solvent remaining in the extract phase is then stripped out with steam in a separate stripping zone at a pressure of about 5 pounds per square inch absolute up to atmospheric. It will be noted that the only extract phase distillation step heated with a source outside the distillation system is the pressure distillation step. Heat for all remaining distillation is provided by the sensible heat of the stream involved and by heat exchange with other distillation system streams.

FIGURE 2 illustrates an alternative method of separating dissolved solvent from the raffinate phase employing water washing in place of distillation. Raffinate phase in line 5 is cooled in exchanger 70 to a temperature of about 150° and passed through line 71 to washing tower 72. Washing tower 72 is a liquid-liquid extraction facility providing about 1 to 10 theoretical stages. Water at about 150° F. is introduced through line 73 and washed raffinate product, substantially free of solvent, is discharged through line 75 to product storage not shown. Water washings, containing dissolved solvent, are withdrawn through line 74 and accumulated with the wet solvent stream in line 16 for recovery of dry solvent as is illustrated in FIGURE 1. Water for washing may be withdrawn from line 55 through line 76 and cooled in heat exchanger 77 to the washing temperature. The separation of solvent from the raffinate phase by water washing reduces the amount of equipment required in the raffinate phase recovery system but increases the amount of water which must be removed from the circulating solvent system.

Description of the preferred embodiments

In a specific application of this invention which constitutes an example of a preferred embodiment, a lubricating oil stock referred to as Wax Distillate 20 is treated with NMP to produce a refined oil (raffinate product) of increased viscosity index and improved inhibitor response useful in the manufacture of high quality lubricating oil of high viscosity index and high stability. The Wax Distillate 20 charge stock comprises a fraction having an ASTM initial boiling point in excess of 60° F. separated from a South Louisiana crude oil by vacuum distillation. The Wax Distillate 20 is refined in the apparatus and at the conditions described in connection with FIGURE 1, that is at a solvent dosage of 120 volume percent and with an extract outlet temperature of 185° F. A yield of 68.9 weight percent of refined oil is obtained. Tests on the charge, refined oil, and extract product are shown in Table I.

A weight balance showing the distribution of NMP, water, and oil fractions in the refining of 10,000 barrels per day of Wax Distillate 20 charge stock is shown in Table II. In Table II, water rates are shown to the nearest pound but are rounded to the nearest thousand in the total. In the modification of the solvent recovery process illustrated in FIGURE 2, wherein water washing is substituted for distillation in the separation of solvent from the raffinate phase, the raffinate phase is washed with 272 thousand pounds per day of water. The wash water and extracted solvent are included in the charge to the solvent drying distillation tower which then comprises 2,084 thousand pounds per day of NMP and 296 thousand pounds per day of water.

TABLE I.—CHARGE STOCK AND PRODUCT TESTS

| Identification | Wax Distillate 20 | Refined Oil Product | Extract Product |
|---|---|---|---|
| Tests: | | | |
| Gravity, °API | 24.9 | 30.5 | 14.9 |
| Flash Cleveland Open Cup, °F | 455 | 455 | 455 |
| Viscosity, SUS at 100° F | 421 | 268 | |
| Viscosity, SUS at 150° F | | 93.7 | |
| Viscosity, SUS at 210° F | 56.0 | 51.3 | 119.7 |
| Viscosity Index | 76.5 | 105.0 | |
| Dewaxed Viscosity Index | | 91 | |
| Pour, °F | +100 | +110 | +55 |
| Dewaxed Pour, °F | | 0 | |
| Color, Lovibond 6″ cell | 390 | 10 | |
| Carbon Residue, Wt. percent | 0.10 | 0.02 | 2.04 |
| Ash, Wt. percent | 0.002 | None | |
| Neutralization No | 0.60 | 0.03 | |
| Sulfur, Wt. percent | 0.48 | 0.16 | 1.2 |
| Percent Wax, Wt. percent | 7.8 | 10.8 | |
| Refractive Index | 1.4832 | 1.4625 | 1.5394 |
| Dissolved Water, Wt. percent | 0.02 | | |

TABLE II.—WEIGHT BALANCE
[Thousands of Pounds Per Day]

| | Charge oil | NMP | Water | Extract Oil | Refined Oil | Total |
|---|---|---|---|---|---|---|
| Wax Distillate 20 Charge | 3,163 | | 0.633 | | | 3,164 |
| Raffinate Phase | | 545 | 0.080 | | 2,180 | 2,725 |
| Extract Phase | | 3,791 | 0.553 | 984 | | 4,776 |
| Solvent Charge | | 4,336 | | | | 4,336 |
| Distillate, Raffinate Vacuum Distillation Tower | | 505 | 0.080 | | | 505 |
| Bottoms, Raffinate Vacuum Distillation Tower | | 40 | | | 2,180 | 2,220 |
| Distillate, Raffinate Vacuum-Steam Distillation Tower | | 40 | 40.319 | | | 80 |
| Raffinate Product | | | | | 2,180 | 2,180 |
| Steam To Raffinate Vacuum-Steam Distillation Tower | | | 40.319 | | | 40 |
| Distillate, Atmospheric Distillation Tower | | 1,516 | 0.553 | | | 1,517 |
| Bottoms, Atmospheric Distillation Tower | | 2,275 | | 984 | | 3,259 |
| Distillate, Pressure, Distillation Tower | | 2,161 | | | | 2,161 |
| Bottoms, Pressure Distillation Tower | | 114 | | 984 | | 1,098 |
| Distillate, Extract Vacuum Distillation Tower | | 91 | | | | 91 |
| Bottoms, Extract Vacuum Distillation Tower | | 23 | | 984 | | 1,007 |
| Distillate, Extract Vacuum-Steam Distillation Tower | | 23 | 22.746 | | | 45 |
| Extract Product | | | | 984 | | 984 |
| Steam To Extract Vacuum-Steam Distillation Tower | | | 22.746 | | | 23 |
| Wet Solvent To Solvent Drying Distillation Tower | | 2,084 | 63.698 | | | 2,148 |
| Bottoms, Solvent Drying Distillation Tower | | 2,084 | | | | 2,084 |
| Distillate, Solvent Drying Distillation Tower | | | 63.698 | | | 64 |

We claim:
1. A process for the solvent extraction of a hydrocarbon mixture boiling wholly above 396° F. effecting separation of said hydrocarbon mixture into a raffinate product of reduced aromaticity and an extract product of increased aromaticity wherein extraneous water is introduced in handling feed and process stream which comprises:

contacting said hydrocarbon mixtures with a solvent comprising N-methyl-2-pyrrolidone in an extracting zone forming a raffinate phase comprising said raffinate product with a minor portion of said solvent dissolved therein and an extract phase comprising said solvent with said extract product and water dissolved therein, separating said raffinate product from said raffinate phase, passing said extract phase to a first distillation zone maintained at a pressure within the range of about 0 to 25 pounds per square inch gauge and effecting separation of a first distillate comprising a minor portion of said solvent in said extract phase and water from first distillation bottoms product substantially free of water, passing said first distillation bottoms product to a second distillation zone at least a part of which is maintained at a pressure within the range of about 25 to 100 pounds per square inch gauge and effecting separation of a second distillate comprising a major portion of said solvent in said extract phase substantially free of water from second distillation bottoms product, passing said second distillation bottoms product to a third distillation zone which is maintained at a pressure within the range of about 5 pounds per square inch absolute up to atmospheric and which is in contact with steam effecting separation of a third distillate comprising said solvent and water from a third distillation bottoms product comprising said extract product substantially free of said solvent, passing said first distillate and said third distillate to a fourth distillation zone effecting separation of water as a fourth distillate from fourth distillation bottoms product comprising said solvent substantially free of water, and passing said second distillate and said fourth distillation bottoms product to said extraction zone as at least a portion of said solvent in said extraction zone.

2. The process of claim 1 wherein said second distillation zone comprises two parts and the second part is maintained at about the same pressure as said third distillation zone.

3. The process of claim 1 wherein said distillate from said second distillation zone is passed in indirect heat exchange with said extract phase passed to said first distillation zone.

4. The process of claim 1 wherein said raffinate phase is passed to a fifth distillation zone effecting separation of said solvent and water as a fifth distillate from fifth distillation bottoms product comprising said raffinate product.

5. The process of claim 4 wherein said fifth distillate is passed with said first distillate and said third distillate to said fourth distillation zone.

6. The process of claim 4 wherein said fifth distillation zone comprises two parts and the distillation in the second part is effected at a pressure within the range of 5 pounds per square inch gauge up to atmospheric in contact with steam.

7. The process of claim 1 wherein said raffinate phase is contacted with water in a water washing zone effecting separation of said raffinate product from a water solution of said solvent and passing said water solution of said solvent with said first distillate and said third distillate to said fourth distillation zone.

8. The process of claim 7 wherein said fourth distillate is passed to said water washing zone to provide at least a portion of the water in said water washing zone.

9. The process of claim 1 wherein said solvent and said hydrocarbon mixture are contacted in said extraction zone at an extract phase outlet temperature of about 185° F. and at a solvent dosage of 120 volume percent of said hydrocarbon mixture.

References Cited

UNITED STATES PATENTS

| 2,963,427 | 12/1960 | Nevitt | 208—324 |
| 3,167,501 | 1/1965 | Woodle | 208—321 |
| 3,306,849 | 2/1967 | Bozeman et al. | 208—314 |
| 3,200,065 | 8/1965 | Cottington | 208—321 |

FOREIGN PATENTS 610,414  12/1960  Canada.

HERBERT LEVINE, Primary Examiner

U.S. Cl. X.R.

208—324, 326